2,758,026
Patented Aug. 7, 1956

2,758,026

SIZED WATERLAID GLASS FIBER PRODUCTS AND PROCESS OF PREPARING THE SAME

Chester G. Landes, New Canaan, and Walter F. Reynolds, Jr., Stamford, Conn., assignors to American Cyanamid Company, New York, N. Y., a corporation of Maine No Drawing. Application May 31, 1952,
Serial No. 291,073

5 Claims. (Cl. 92—3)

This invention relates to the production of sized or water-repellent waterlaid fibrous products, including paper, hardboard, insulating board and the like, composed of or containing glass fibers having applied thereto a novel class of sizing agents. The invention includes the sized glass fiber-containing paper or other waterlaid products as well as their mehods of production and the novel sizing agents applied thereto.

We have discovered a class of hydrophobic or water-repellent condensation products which are substantive to glass fibers; i. e. which, when added to a relatively dilute aqueous suspension containing glass fibers, will precipitate or deposit thereon in quantities sufficient to impart sizing and water repellency to paper and board subsequently made therefrom by conventional papermaking processes. The condensation products possessing these unusual and advantageous properties are the hereinafter defined higher fatty acid-polyalkylenepolyamine amides which are applied in the form of their water-soluble or water-dispersible salts. After adsorbing the water-dispersed condensation products on the glass fibers, the treated fibers are formed into paper or board by any known or approved forming procedure; the resulting paper may be dried, with or without the incorporation of fillers or other materials, and with or without pressing or rolling into hardboard, insulating board or other forms or shapes.

The higher fatty acid-polyalkylenepolyamine amides may be used either as the simple salts thereof or after further alkylation by reaction with epichlorhydrin, other epihalohydrins, or other similar alkylating agents. In either case the sizing action obtained is resistant to alkaline conditions; i. e., glass fiber paper and board sized therewith is not desized by the action of alkalies. On the contrary, in many cases the presence or addition of alkalies appears to fix the sizing agent even more firmly to the glass fibers, and thus to enhance the water repellency and sizing action thereof.

In preparing the amides, at least two mols of one or more higher fatty acids containing at least about 8 or more and preferably from 14–22 carbon atoms are condensed with one mole of one or more polyalkylenepolyamines. The condensation products may be further reacted with from one to two mols of epichlorhydrin or other alkylating agent for each mol of polyalkylenepolyamine if desired. In either case the amides are applied to the glass fibers in the form of their water-soluble or water-dispersible salts of water-soluble acids such as hydrochloric acid, acetic acid and the like. Usually quantities of from 0.1 to 1% up to 5% by weight of the amide are employed, based on the dry weight of the glass fiber. After the sizing agent is absorbed the fibers are formed into paper, board or other shapes and heated at the times and temperatures usually employed in paper mills for drying purposes; i. e., in the case of paper manufacture at about 105–150° C. for 0.5–3 minutes or longer, and during this heating the sizing properties of the condensation products are developed on the fibers.

The polyalkylenepolyamines used in preparing the amides employed in practicing the invention are well known compounds corresponding to the formula $$H_2N(C_nH_{2n}.HN)_xH$$

in which $x$ is 2 or more. Typical compounds of this class are diethylenetriamine, triethylenetetramine, tetraethylenepentamine and the corresponding polypropylenepolyamines and polybutylenepolyamines. All of these compounds are basic and are characterized by the property of condensing with higher fatty acids and mixtures thereof in the ratio of at least two mols of fatty acid for each mol of polyalkylenepolyamine to form amides useful in sizing paper.

Any fatty acid containing a sufficient number of carbon atoms to impart hydrophobic properties may be reacted with any of the above polyalkylenepolyamines to form the amides which are condensed with epichlorhydrin and used in practicing the invention. Commercial mixtures of higher fatty acids, either saturated or unsaturated, may be employed. Thus, for example, cottonseed oil fatty acids, coconut oil fatty acids or the acids from animal fats such as tallow, lard and the like, may be used. Where a high proportion of saturated fatty acids is desired these acids may be hydrogenated prior to their use. Thus, for example, the acids of hydrogenated tallow may be employed. Where a substantial proportion of fatty acids containing more than 18 carbon atoms is desired, hydrogenated fish oil fatty acids may be used. Tall oil fatty acids and hydrogenated tall oil fatty acids may also be employed. Although in general any fatty acid of from about 8 to 22 or more carbon atoms may be used, for most purposes we prefer to use fatty acids of 16–18 carbon atoms, such as those from hydrogenated tallow, since these are relatively low in cost and produce excellent sizing agents.

The higher fatty acid-polyalkylenepolyamine amides are prepared simply by heating the reagents together in the requisite proportions. However, in order to avoid discoloration, it is advisable to carry out the amide-forming reaction in the absence of atmospheric air, and preferably under a blanket of inert gas. This can most advantageously be accomplished by passing a vigorous stream of nitrogen through the reaction mixture during the condensation. Amide-forming temperatures of about 150–200° C. or higher are usually employed for times of 2–8 hours or longer; during this time the water evolved by the reaction is preferably collected and measured. The amide formation is complete when the theoretical amount of water has been evolved.

If desired, the condensation between the polyalkylenepolyamines and the higher fatty acids or mixtures thereof can be carried out in the presence of a solvent such as xylene, toluene and the like. In this case the solvent may form an azeotrope with the water evolved, so the reaction temperature may advantageously be reduced to 150–165° C. Upon completion of the amide-forming reaction the solvent is preferably removed by distillation and the product is stripped of volatiles by heating at reduced pressures.

It will be understood that the maximum amount of fatty acid reacted should not be such as to completely acylate the polyalkylenepolyamine to the extent that products incapable of forming salts with water-soluble acids are formed. The acid-reactive products of the present invention are preferably obtained by leaving at least one nitrogen atom of the polyalkylenepolyamine unreacted; i. e., in all cases the maximum quantity of fatty acid is one mol less than the number of nitrogen atoms in the polyalkylenepolyamine. Thus, for example, not more than two mols of fatty acid is employed for each mol of diethylenetriamine and not more than three mols of fatty acid for each mol of triethylenetetramine. In general, therefore, for each mol of a polyalkylenepolyamine of the formula $$H_2N.(C_nH_{2n}.HN)_xH$$

where $x$ is from 2 to 4, a maximum of $x$ mols of fatty acid should be used. With higher polyalkylenepolyamines such as tetraethylenepentamine, pentaethylenehexamine and the like, not more than four mols of fatty acid per mol of amine should be used. In all cases the minimum ratio is two mols of fatty acid for each mol of polyamine, as has previously been stated.

In preparing alkylated condensation products of the amides, the alkylation reaction may be carried out in the presence or absence of a solvent. Polar solvents such as ethanol, isopropanol, tertiary butanol and the like are preferably employed. If no solvent is used, the amide is preferably melted and maintained at temperatures between 60° C. and 100° C. with agitation while the epichlorhydrin or other alkylating agent is added dropwise or in a slow stream. Under these conditions reaction times of about 1–3 hours are usually employed, these being sufficient to complete the condensation but not so long as to produce excessive cross-linkages with formation of acid-insoluble products. When a solvent is used, the alkylation is preferably carried out under reflux conditions; i. e., at the boiling point of the solution at atmospheric pressure and for reaction times of about 1–5 hours. Although complete identification of the condensation products is impossible, they are properly designated as alkylated polyalkylenepolyamine-fatty acid amides, the alkylation taking place either through the epoxide ring or the chlorine atom of the epichlorhydrin. In any event, HCl or other corresponding hydrohalide is developed during the condensation and forms a hydrochloride salt of the alkylation product.

The higher fatty acid-polyalkylenepolyamine amides are applied to the glass fibers while the fibers are suspended in water and before they are formed into paper, board or other waterlaid product. In most cases a dilute aqueous suspension of the glass papermaking fibers is first prepared, usually at consistencies within the range of about 0.5–2% solids, and an aqueous dispersion of the amide salt is added thereto. The stock suspension may consist entirely of glass fibers, or it may be a mixture of glass fibers with papermaking fibers of other types, such as kraft pulp, sulfite pulp, groundwood pulp or other cellulosic papermaking fibers; cotton flocks, viscose or other regenerated cellulose threads, nylon fibers, and the like. It is an important advantage of the invention that the fatty acid-polyalkylenepolyamine amide salts are also substantive to cellulosic fibers, and therefore can be used to size mixed stock suspensions of the above described types; however, of course, similar results can be obtained by applying the sizing material separately to the glass fibers, in one suspension, and to the cellulosic fibers, in another suspension, and then mixing the two stock suspensions together.

Inamuch as the higher fatty acid-polyalkylenepolyamine amides are water-soluble or water-dispersible in the form of their acid salts, they should be added to the fiber suspension at a pH below 7. Experience has shown that the best results are obtained when pH values below 6 are used, and the preferred range is between about 4.5 and 5.5. After the sizing agent has been added and adsorbed, the stock may be made into paper or board without neutralization if desired; however, the addition of alkalies such as caustic soda, lime, calcium carbonate and the like does not materially reduce the sizing action. The pH of the stock therefore may be raised as high as 9–10 prior to the forming step if desired.

A further important advantage of the novel sizing agents of the present invention resides in the improved results obtainable when they are applied along with starches, gums, wax sizes and other organic sizing or filling agents. It has been found that the addition of from 0.1% to 3% or more of these materials, along with from about 0.1% to 1.5% or more of the amides of the present invention, based on the dry weight of the fibers, results in still further improvements in water resistance, particularly in glass-wood fiber board made from 60–80% glass fibers and 40–20% groundwood or kraft cellulosic fibers. Suitable starches are corn starch, potato starch, wheat starch and the like. Locust bean gum and other mannogalactans, casein and other proteins and similar gums may be employed, preferably after solubilization with borax or other alkali. Any of the commercially available wax size emulsions may be employed.

The quantity of the new sizing agents to be employed depends on the type of paper or board being made, on the water resistance desired, and on the heating times and temperatures to be employed in drying the paper or board. It has been found that as little as 0.2% to 1% can be employed, based on the dry weight of the fibers, when glass fiber paper is dried by heating at 115–130° C. for from 1 to 2 minutes. Quantities of the sizing agent within the range of 0.5% to about 2% are recommended for most purposes. More than 5%, based on the dry weight of the paper pulp, does not seem to increase further the water resistance of glass-fiber paper, but may sometimes be useful in board manufacture. Any of the temperatures and times ordinarily used in paper mills to dry the paper from the forming machine, such as temperatures of 105° to 150° C. for 0.5 to 3 minutes may be employed; in hardboard manufacture platen temperatures up to 460°–500° F. for as long as 20–30 minutes may be used.

The invention will be further described by the following specific examples. It should be understood, however, that although these examples may describe certain features of the invention in detail, they are given primarily for purposes of illustration and the invention in its broader aspects is not limited thereto.

*Example 1*

A mixture of 63 grams of tetraethylenepentamine and 199 grams of a commercial mixture of saturated fatty acids of 16 to 18 carbon atoms, obtained by the hydrogenation of tallow, was prepared. This mixture was heated in a flask at 200° C. for 8 hours, during which time a stream of nitrogen was continuously passed through it and the gases were vented to atmosphere. A yield of 248 grams of a dark brown hard wax was obtained.

A portion of the wax weighing 336.93 grams was melted by heating it to about 90° C. and 6 grams of glacial acetic acid were stirred in. Experience has shown that products suitable for use in practicing the present invention are obtained when from 1 to 2 mols of glacial acetic acid are used for each mol of tetraethylenepentamine reacted.

*Example 2*

A mixture of 199 grams of hydrogenated tallow and 51.5 grams of diethylenetriamine was prepared and heated at 200° C. for 4 hours in an atmosphere of nitrogen, using the procedure described in Example 1. The reaction product was acidified with acetic acid, using 1.57 grams of glacial acetic acid for each 12.1 grams of product.

*Example 3*

Distearoyl tetraethylenepentamine was prepared by heating a mixture of 285 parts by weight of stearic acid and 190 parts of tetraethylenepentamine at 165–180° C. in an atmosphere of nitrogen until water evolution was substantially complete, raising the temperature to 200° C. and maintaining it at this level for a total time of 4 hours.

A mixture of 37.5 grams (0.05 mol) of the product and 9.25 grams of (0.1 mol) of epichlorohydrin was suspended in 50 cc. of ethanol and heated to boiling under a reflux condenser for 4 hours. The resulting product was stripped by heating at 1 mm. of mercury pressure. By this procedure there was obtained 43 grams of a light brown wax containing 1.25 mols of epichlorhydrin reacted for each mol of distearoyl tetraethylenepentamine.

Example 4

A product similar to that of Example 1 was prepared by reacting a hydrogenated tallow with triethylenetetramine in the molar ratio of 2.4 to 1. The hydrogenated tallow was composed of 1.2% myristic acid, 20.4% palmitic acid, 76.8% stearic acid and 1.6% oleic acid; its acid number was 200–203 and its average molecular weight was about 276–280. A portion of this mixture weighing 5854 grams was charged into a jacketed kettle along with 1314 grams of triethylenetetramine and the charge was heated at 200° C. for 2 hours in a nitrogen atmosphere while continuously distilling off the water liberated. When the condensation was complete the product was cooled to 110° C. and 660 grams of glacial acetic acid were added. After an additional 15 minutes the product was poured into trays and allowed to solidify, resulting in a brittle waxy material that was dispersible in hot water.

Example 5

A mixture of 3580 grams (12.6 mols) of stearic acid, 649 grams (6.3 mols) of diethylenetriamine and 100 cc. of xylene was reacted with distillation of water during 10 hours. The remaining xylene was removed by heating under reduced pressure to 160° C. The product, weighing 3891 grams, was a light tan hard wax that was soluble in dilute acetic and hydrochloric acids. A sample was dissolved in dilute hydrochloric acid, using 2 mols of acid for each mol of diethylenetriamine.

Example 6

Fatty acids containing from about 8 to 22 carbon atoms can be used in preparing the polyalkylenepolyamine amides used in practicing the present invention. Mixtures of these fatty acids are particularly useful as they are available commercially in large quantities. Thus, for example, a commercial mixture of hydrogenated fish oil acids having an average molecular weight of 288 may be used. A polyethylenepolyamine amide was prepared by reacting 115 grams of this fatty acid mixture with 38 grams of tetraethylenepentamine by the procedure described in Example 1. One half of this amide was melted and mixed with 12 grams of glacial acetic acid to produce a water-soluble product (6a). The other half was boiled with 57 grams of epichlorhydrin in 300 cc. of ethanol for 4 hours after which the solvent and other volatiles were removed by vacuum distillation to produce a water-soluble product.

Another amide (6b) was prepared by reacting 73 grams of coconut fatty acids with 38 grams of tetraethylenepentamine, using the same procedure and reacting the product with an equimolecular quantity of glacial acetic acid.

Example 7

Glass fiber stock of 0.5 to 0.75 micron diameter was suspended in water and circulated for one hour in a beater with the roll up. The resulting suspension of short glass fibers was separated into a number of batches to which varying amounts of the amides of Examples 1–6 were added. The pH of the stock at the point of size addition was adjusted to 5.0.

The treated stock was made into paper on a laboratory handsheet machine under the usual forming conditions; i. e., at a stock consistency of 0.6% solids. The sheets were couched on a blotter and then placed between two dry blotters and dried by heating for 8 minutes at 240° F.

Samples of the resulting glass fiber paper were tested for water absorption and for water repellency. The water absorption tests were conducted by immersing weighed squares of the paper in water at 73° F. for 5 minutes and noting the percent increase in weight. Water repellency was determined by holding the handsheet at a 15° angle from the horizontal and noting the behavior of a water drop placed on the surface. Sizing tests for water penetration were made on the standard Currier tester using the hard scale. The following table shows the results obtained; in the heading of this table the amount of size is expressed as percent solids based on the dry weight of the glass fiber.

| Sheet No. | Product of Example No. | Amount | Currier | Percent Water Absorption | Behavior of Water Drop |
|---|---|---|---|---|---|
| 1 | 1 | 0.5 | >15 min | 217 | a. |
| 2 | | 0.75 | do | 213 | a. |
| 3 | | 1.0 | do | 215 | a. |
| 4 | 2 | 0.5 | 8 min | 440 | b. |
| 5 | | 1.0 | >15 min | 332 | a. |
| 6 | 3 | 0.25 | 30 sec | 830 | c. |
| 7 | | 0.5 | >15 min | 310 | b. |
| 8 | | 1.0 | do | 203 | a. |
| 9 | 4 | 0.25 | 15 sec | 1,075 | c. |
| 10 | | 0.5 | >15 min | 211 | b. |
| 11 | | 0.75 | do | 214 | a. |
| 12 | | 1.00 | do | 229 | a. |
| 13 | | 2.00 | do | 198 | a. |
| 14 | 5 | 0.5 | 5 min | 422 | b. |
| 15 | 6a | 0.25 | 46 sec | 770 | c. |
| 16 | | 0.5 | >15 min | 210 | a. |
| 17 | | 1.0 | do | 208 | a. |
| 18 | 6b | 0.5 | 3 min | 738 | b. |
| 19 | | 1.0 | >15 min | 372 | a. |
| 20 | Control | None | Instantaneous | 2,250 | Instantaneous Absorption. | a=Rolled with no wetting of the paper.
b=Rolled with slight wetting of the paper.
c=Did not roll; contact angle >120°; slight wetting of the paper.

Example 8

A stock suspension made from rather coarse glass fibers was mixed with a beaten groundwood stock in a dry weight ratio of 75% glass fiber to 25% cellulosic fiber. The pH of the mixture was adjusted to 4.5–5.0 and it was divided into several batches to which varying quantities of the product of Example 4 were added. In some of these batches a quantity of calcium hydroxide was then added sufficient to bring the pH to about 6.5–7.

The batches were made into board on a laboratory sheet-making machine. The board was couched on drying felts and then placed in a hydraulic press with heated platens and pressed for about 20 minutes with a platen temperature of about 460° F. Hardboard having a thickness varying from ⅛ inch to ¼ inch was made by this procedure. Board made by this process, but containing no sizing agent, absorbs about 40% by weight of moisture when soaked in water for 24 hours. When quantities of the triethylenetetramine-fatty acid amide salt of 0.5% to 1% were added, based on the dry weight of the fibers, this figure was reduced to below 20%. When 2% of the size was used, the water absorption was less than 15%. The addition of 1% of wax in the form of a wax size emulsion after first applying 1% of the amide salt was also effective in reducing the water absorption.

What we claim is:

1. A method of producing a sized waterlaid glass fiber product which comprises preparing a dilute aqueous suspension of glass fibers, adding thereto a small quantity within the range of about 0.2% to 5% on the dry weight of said fibers of the amide formed by condensing from 2 to 4 mols of a saturated higher fatty acid of about 14–22 carbon atoms with 1 mol of a polyalkylenepolyamine of the formula $$H_2N(C_nH_{2n}.HN)_xH$$

where $x$ is a whole number greater than 1, not more than $x$ mols of fatty acid per mol of amine being used when $x$ is from 2 to 4, inclusive, and converting the amide into a water-soluble acid salt, adsorbing the amide on said glass fibers and forming the treated fibers into a waterlaid product, and heating the product to dry the same and develop the sizing properties of the amide thereon.

2. A method of producing a sized waterlaid glass fiber product containing a member of the group consisting of starches, gums and hydrocarbon waxes which comprises preparing a dilute aqueous fiber suspension composed predominantly of glass fibers, adding thereto a small quantity of a water-soluble acid salt of the amide formed by condensing from 2 to 4 mols of a saturated fatty acid of 8–22 carbon atoms with 1 mol of a polyalkylenepolyamine of the formula $$H_2N(C_nH_{2n}.HN)_xH$$

where $x$ is a whole number greater than 1, not more than $x$ mols of fatty acid being used when $x$ is from 2 to 4 inclusive, the quantity of said amide salt being such that about 0.1% to 1.5% of said amide is absorbed on the fibers, adding to the fibers so treated a quantity of an aqueous dispersion of a member of the group consisting of starches, gums and hydrocarbon waxes sufficient to deposit about 0.1% to 3% of the dry fiber weight thereon, forming the resulting furnish into a waterlaid product, and heating the product to dry the same and develop the sizing properties of the amide thereon.

3. A method according to claim 2 in which the polyalkylenepolyamine is a polyethylenepolyamine and $x$ is from 2 to 4 inclusive.

4. A sized waterlaid fibrous product composed predominantly of glass fibers sized by an adsorbed content of about 0.1% to 5% of their dry weight of a higher fatty acid-polyalkylenepolyamine amide prepared by condensing from 2 to 4 mols of saturated fatty acid containing about 14 to 22 carbon atoms with 1 mol of a polyalkylenepolyamine of the formula $$H_2N(C_nH_{2n}.HN)_xH$$

where $x$ is a whole number greater than 1, not more than $x$ mols of fatty acid per mol of amine being used when $x$ is from 2 to 4, inclusive, and converting the amide into a water-soluble acid salt, said amide salt having been adsorbed on said fibers from an aqueous suspension thereof followed by forming the treated fibers into a waterlaid sheet and heating to dry the same and develop the sizing properties of the amide thereon.

5. Paper composed predominantly of glass fibers sized by an adsorbed content of about 0.1% to 5% of their dry weight of an amide formed by condensing from 2 to 4 mols of a saturated fatty acid of 14–22 carbon atoms with 1 mol of a polyethylenepolyamine of the formula $$H_2N(C_2H_4.HN)_xH$$

where $x$ is a whole number greater than 1 and containing not more than $x$ mols of combined fatty acid per mol of amine when $x$ is from 2 to 4 inclusive, said amide having been applied to said fibers in aqueous suspension from a water-soluble salt thereof followed by forming the treated fibers into paper and heating the paper to dry the same and develop the sizing properties of the amide thereon.

References Cited in the file of this patent

UNITED STATES PATENTS

| | | |
|---|---|---|
| 2,407,376 | Maxwell | Sept. 10, 1946 |
| 2,483,797 | Van Valkenburgh | Oct. 4, 1949 |
| 2,487,899 | Sherman | Nov. 15, 1949 |
| 2,489,242 | Slayter et al. | Nov. 22, 1949 |
| 2,504,744 | Sproull et al. | Apr. 18, 1950 |
| 2,518,148 | Jordan et al. | Aug. 8, 1950 |
| 2,601,597 | Daniel et al. | June 24, 1952 |
| 2,601,671 | Wilson et al. | June 24, 1952 |
| 2,609,931 | Rodman et al. | Sept. 9, 1952 |
| 2,641,593 | Teeter | June 9, 1953 |
| 2,694,630 | Landes et al. | Nov. 16, 1954 |
| 2,698,793 | Landes et al. | Jan. 4, 1955 |